Nov. 22, 1955  L. W. CAMP  2,724,818
MAGNETOSTRICTION VIBRATOR CONSTRUCTION
FOR DIRECTIONAL TRANSDUCERS
Filed Aug. 21, 1951  2 Sheets-Sheet 1

INVENTOR.
Leon W. Camp
BY
ATTORNEY

Nov. 22, 1955    L. W. CAMP    2,724,818
MAGNETOSTRICTION VIBRATOR CONSTRUCTION
FOR DIRECTIONAL TRANSDUCERS
Filed Aug. 21, 1951    2 Sheets-Sheet 2
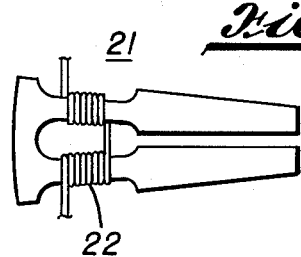
Fig. 5
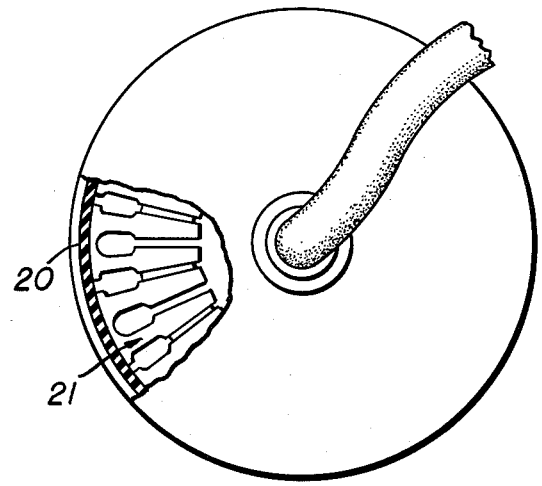
Fig. 4
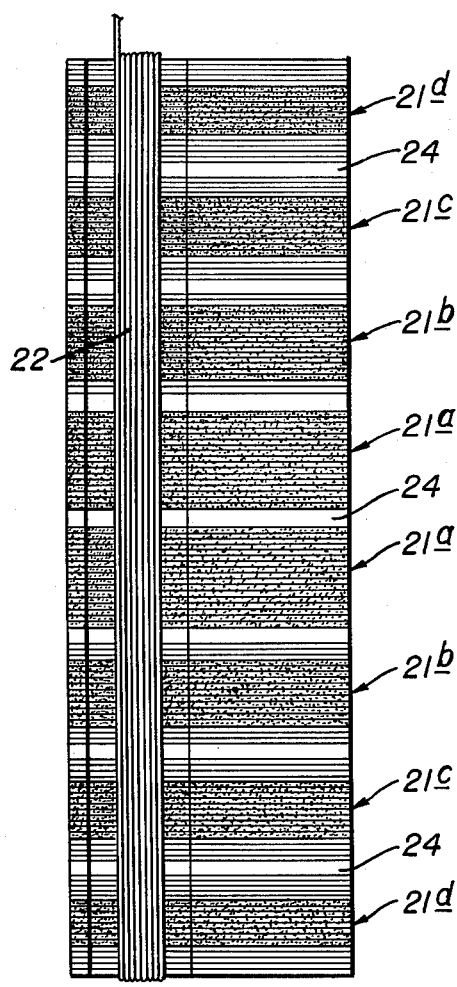
Fig. 6
INVENTOR.
Leon W. Camp
BY
ATTORNEY United States Patent Office 2,724,818
Patented Nov. 22, 1955

2,724,818

MAGNETOSTRICTION VIBRATOR CONSTRUCTION FOR DIRECTIONAL TRANSDUCERS

Leon W. Camp, Glendale, Calif., assignor to Bendix Aviation Corporation, North Hollywood, Calif., a corporation of Delaware Application August 21, 1951, Serial No. 242,839

9 Claims. (Cl. 340—9)

This invention relates to underwater transducers of the magnetostriction type and has particular application to transducers having an array of individual units so disposed as to produce desired directional effects.

An object of the invention is to economize in the use of magnetostriction material.

Another object is to simplify the construction of magnetostriction transducers employing an array of vibrator units for increasing directivity.

Other more specific objects and features of the invention will appear from the description to follow:

It has long been known that directivity of an underwater transducer is increased by making the transmitting face large relative to the wave length in water. It is also known that the effect of a large face can be obtained by using a large number of small vibrator units positioned in a common surface, and that directional characteristics can be improved in some respects for some purposes by making the units progressively less sensitive from the middle to the outer edge. This is commonly referred to as "shading."

To the best of my knowledge, shading in magnetostriction transducers has always been accomplished previously by employing magnetostriction units having identical cores but using smaller windings (fewer turns) on the less sensitive units than on the more sensitive units.

In accordance with the present invention, I may employ identical windings on all the units, but use less magnetostriction material in the less sensitive units than in the more sensitive ones. The cores should, however, all be of the same physical dimensions in order to have proper acoustic characteristics.

Further in accordance with the invention, I produce magnetostriction units of uniform dimensions and varying efficiency by substituting a non-magnetostrictive material for a portion of the magnetostrictive material in the cores of the less sensitive units. The non-magnetostrictive material should have substantially the same rigidity as the magnetostrictive material. It is common to employ nickel as the magnetostriction material, and a satisfactory non-magnetostrictive material to use with nickel is aluminum. However, various other materials, such as brass, may be used.

For most magnetostriction transducers, to reduce eddy current losses, it is common to use, as a core, a stack of identical laminations. In practicing the present invention, some of the nickel laminations are replaced by aluminum laminations. All the nickel laminations may be bonded together in one group, and all of the aluminum laminations bonded together in another group, but the two groups are not bonded to each other, and do not necessarily vibrate as a unit. It is sometimes desirable to split the magnetostriction laminations and the non-magnetostriction laminations into a plurality of groups, and sandwich them together.

As used herein, "bonded together" means that the laminations are secured together with such adhesion that they are forced to vibrate in unison. This is commonly done by cementing the laminations to each other. It may also be accomplished by clamping the laminations together so tightly that the surface friction therebetween forces vibration in unison.

The invention has the following advantages:

1. Since windings on all units are identical, the manufacture of the windings is simplified.

2. Expensive magnetostriction material is saved.

3. The magnetostriction material in all the units of a shaded directional transducer is worked at the same flux density, since the latter is a function of the ampere turns of the winding irrespective of the amount of magnetostrictive material present. This produces uniform directional characteristics at all currents, since all cores saturate at the same current level.

A complete understanding of the invention may be had from the following detailed description with respect to the drawing, in which:

Fig. 4 is a plan view of a cylindrical transducer incorporating the invention for producing high directivity in all directions in a horizontal plane.

Fig. 5 is a plan view, and Fig. 6 is a side elevational view, of one vertical row of magnetostrictive units in the transducer of Fig. 4.

Figure 1:
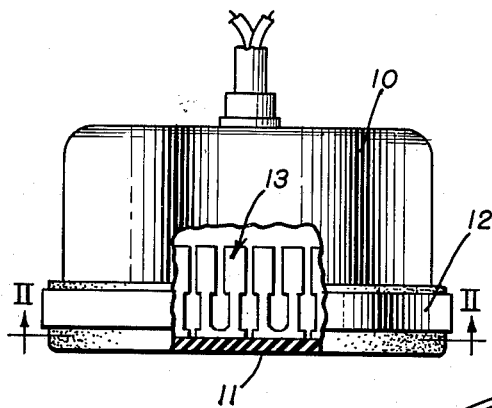
Fig. 1 is a side elevational view of a magnetostriction transducer having a planar array of units in accordance with the invention, for producing high directivity downwardly.

Referring first to Fig. 1, the transducer therein disclosed comprises a cup-shaped case 10, the open end of which is closed by a rubber window 11, which may be secured in sealing relation to the cup by a band clamp 12. Positioned within the casing 10, and supported therein by being bonded to the inner surface of the rubber window 11, are a plurality (in this instance 32) of magnetostrictive units 13.

Figure 3:
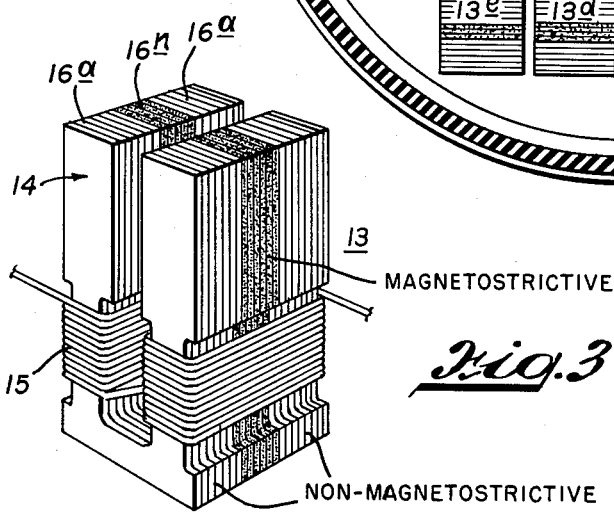
Fig. 3 is a perspective view of one of the units in the transducer of Figs. 1 and 2.

As best shown in Fig. 3, each unit 13 comprises a laminated core 14 of general U shape, with windings 15 on each leg of the core. The shape of core 14 shown in the drawings is in accordance with my Patents No. 2,550,771, issued May 1, 1951, and 2,530,224, issued November 14, 1950, to which reference is made. It is to be understood, however, that the present invention is not restricted in its application to magnetostriction cores of the particular shape shown, but may be used with various known types of magnetostrictive cores.

The particular unit shown in Fig. 3 has its core 14 formed of a plurality of aluminum laminations 16a and nickel laminations 16n, all of which laminations may have the same dimensions, although it is not essential that the thickness of the aluminum laminations be the same as that of the nickel laminations.

As shown in Fig. 3, all of the nickel laminations 16n are grouped together and are sandwiched between two groups of aluminum laminations 16a. All of the nickel laminations 16n are bonded together for vibration in unison, and all of the aluminum laminations in each of the two groups 16a, 16a are bonded together. However, the group of nickel laminations 16n is not bonded to the groups of aluminum laminations 16a, 16a, so that the different groups are not constrained to vibrate in unison with each other. In this connection, the windings 15 do not bind the laminations together. It has long been conventional practice to mount the windings loosely on magnetostriction vibrators so that they do not vibrate with the core.

In the construction shown in Fig. 3 the lower, solid end of the core 14 is utilized as the working face, and this end face is bonded to the surface of the rubber window 11.

In this way, the separate units are not only supported with respect to the window 11, but with respect to each other. As used herein, the working face of the unit or core means the face in direct sound transmitting and receiving relation to the fluid medium through which the sound is to be transmitted or received. It is well known that a rubber sound window, such as the window 11, has substantially the same acoustic impedance as water and propagates sound waves in the same manner. Transducers having heavy metal diaphragms to which the magnetostrictive elements are rigidly bonded function in a different manner, the magnetostrictive elements serving as driving elements for the diaphragm, the outer surface of which constitutes the working face in sound transmitting and receiving relation to the fluid medium. The present invention is not applicable to the latter type of transducer, but only to the type disclosed herein, in which the surfaces of the individual magnetostriction units themselves constitute the working faces.

Figure 2:
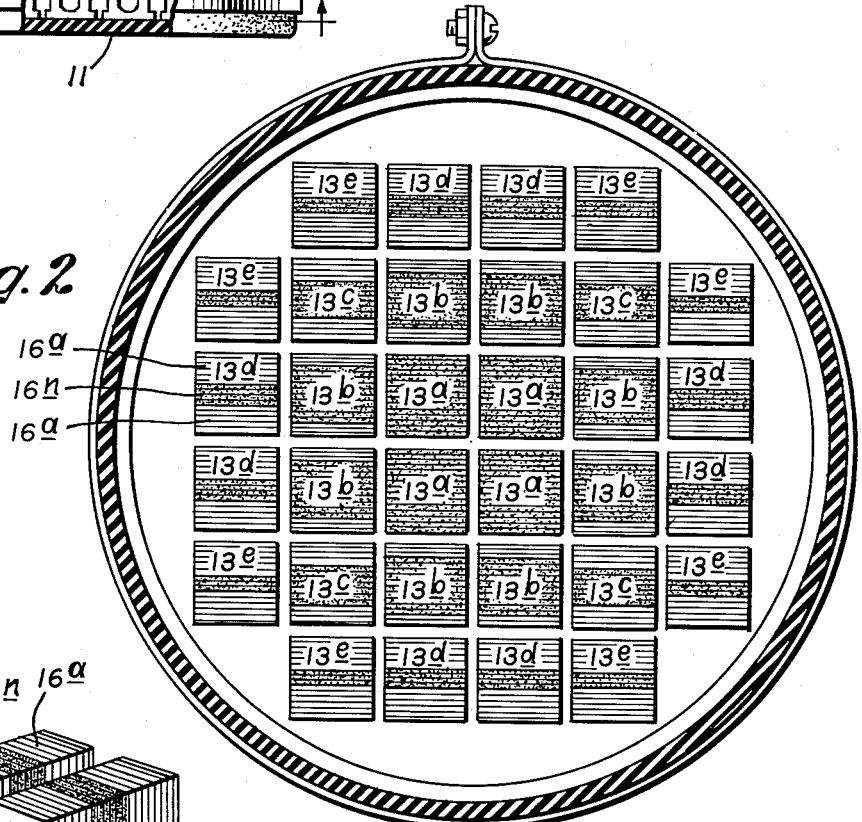
Fig. 2 is a cross section in the plane II—II of Fig. 1.

Referring to Fig. 2, it will be noted that the number of nickel and aluminum laminations in the different units differs according to the positions of the units in the array. The four central units 13a are intended to be the most sensitive, and the cores of these units consist solely of nickel laminations. The 8 units 13b disposed alongside the four units 13a are of slightly less sensitivity, and in these units the nickel laminations 16n are relatively large in number compared to the aluminum laminations 16a. The four units 13c at the corners of the inner array consisting of the four units 13a are of lesser sensitivity than the units 13b, and contain a lesser number of nickel laminations and a proportionately larger number of aluminum laminations. The eight outer units 13d have a still smaller number of nickel laminations and a larger number of aluminum laminations. The eight outer corner units 13e are the least sensitive of all and contain a lesser number of nickel laminations and a larger number of aluminum laminations than do the units 13d.

Regardless of the relative number of nickel and aluminum laminations in each unit 13, the core 14 of each unit has the same overall dimensions as all the other units, and the windings 15 may be identical for all of the units. This permits the interconnection of the windings in series relation to provide the same current and magnetizing force in all the units. If it is desired to connect the units in parallel or series parallel, the number of turns can be varied to provide the desired ampere turns for each unit. The number of turns can also be varied to increase or decrease the shading effect produced by the varying amounts of nickel in the different cores.

Although the aluminum laminations 16a are incapable of responding magnetostrictively to currents in the windings 15, they have approximately the same mechanical resonance characteristics as do the nickel laminations 16n. They therefore vibrate in response to vibration transmitted through the window 11, and appear to have a beneficial effect in increasing the sensitivity of the transducer to mechanical vibration. When the transducer is being used to convert electrical waves into mechanical vibrations, only the nickel laminations 16n are directly energized by the current in the windings 15, but the aluminum laminations 16a appear to provide a favorable mechanical effect on the window 11 to increase the amplitude of the waves transmitted through the window 11 from the nickel laminations to the water.

The cylindrical transducer shown in Fig. 4 has a cylindrical rubber wall or window 20 in vibration conductive relation with the outer ends of a plurality of magnetostriction units 21 which extend radially from the central vertical axis of the transducer. The units 21 are arranged in a plurality of vertical rows or staves, and the staves are uniformly distributed circumferentially about the axis of the transducer. All of the staves are identical in their transmission characteristics, so that, if all of the staves are used simultaneously, the transducer has equal transmitting and receiving properties in all directions in a horizontal plane. Directional effects within the horizontal plane can be obtained by using only some of the staves in the complete array. Such arrangements are well known, and, since they do not constitute a part of the present invention, they need not be described herein.

It is often desirable, in a transducer of the type disclosed in Fig. 4, to confine the directivity of each stave as nearly as possible to the horizontal plane to prevent unnecessary loss of energy upwardly or downwardly, where it would not be utilized. To this end, it has long been the practice to make the central units in each stave more sensitive than the upper and lower end units, and this shading of the sensitivity has heretofore been obtained by employing different numbers of windings on the different magnetostrictive units 21 in each stave. In accordance with the present invention, the desired shading is obtained by using varying amounts of nickel in the transducer units 21, but energizing all of the transducers equally. Such equal energization may be obtained by employing separate windings having the same number of turns on each individual unit 21. However, further in accordance with the invention, I can simplify the construction by employing a single winding 22 (Fig. 6) extending around all the units 21 in the entire stave.

Referring to Fig. 6, there are 8 magnetostrictive units in each stave which are slightly separated by 7 spacers 24 of some insulating material such as plastic. The 2 center units 21a consist entirely of nickel laminations. The next adjacent staves 21b above and below the units 21a have a lesser number of nickel laminations which are sandwiched between a small number of aluminum laminations. The next outer units 21c have a lesser number of nickel laminations sandwiched between a larger number of aluminum laminations, and the extreme upper and lower units 21d contain the smallest number of nickel laminations and the largest number of aluminum laminations.

It is to be noted that the method illustrated in Figs. 5 and 6 of employing a single winding 22 for an entire row of magnetostrictive units can be applied to transducers of the type shown in Figs. 1 and 2. Thus, the array shown in Fig. 2 can be broken down into 6 vertical rows, or 6 horizontal rows. All the units in each of these rows can be provided with a common winding similar to that shown in Fig. 6, and the six windings connected in series.

Although for the purpose of explaining the invention, some particular embodiments thereof have been shown and described, obvious modifications will occur to a person skilled in the art, and I do not desire to be limited to the exact details shown and described.

I claim:

1. A directional transducer comprising an array of individual magnetostrictive vibrator units having individual working faces positioned in a common surface, said transducer having directional characteristics by virtue of graduated sensitivities of units in predetermined different positions in said array; in which each unit comprises a core of the same dimensions as the others and containing magnetostrictive material, but the units of lesser sensitivity have less magnetostrictive material than those of greater sensitivity; and windings associated with said units.

2. A transducer according to claim 1, in which the windings have substantially the same number of turns associated with each unit.

3. A transducer according to claim 1, in which the said cores containing less magnetostrictive material have compensating non-magnetostrictive material therein.

4. A transducer according to claim 3 in which said non-magnetostrictive material is of substantially the same rigidity as said magnetostrictive material.

5. A transducer according to claim 1 in which all of said cores consist of laminations and are of substantially the same dimensions, the cores having less magnetostrictive material containing filler laminations of non-magnetostrictive material.

6. A transducer according to claim 1 in which said units are arranged in a row in said array and said winding comprises a single coil encircling all the units in said row.

7. A magnetostriction transducer comprising a core and a winding associated therewith, the core consisting of a stack of laminations all of the same lateral dimensions but some of the laminations being of magnetostrictive material bonded together in a group for vibration in unison, others of the laminations being of non-magnetostrictive material unbonded to the magnetostrictive laminations.

8. A transducer according to claim 7 in which some at least of the non-magnetostrictive laminations are bonded together in a group.

9. A transducer according to claim 8 comprising alternate groups of magnetostrictive and non-magnetostrictive laminations.

References Cited in the file of this patent

UNITED STATES PATENTS

| | | |
|---|---|---|
| 1,882,397 | Pierce | Oct. 11, 1932 |
| 2,398,117 | Rost et al. | Apr. 9, 1946 |
| 2,407,329 | Turner | Sept. 10, 1946 |

FOREIGN PATENTS

| | | |
|---|---|---|
| 632,249 | Germany | July 4, 1936 |